United States Patent
Terada

(10) Patent No.: US 12,454,457 B2
(45) Date of Patent: Oct. 28, 2025

(54) METHOD FOR PREPARING HYPOCHLOROUS ACID AQUEOUS SOLUTION AND METHOD FOR REGENERATING WEAKLY ACIDIC CATION EXCHANGER

(71) Applicant: EVATEC CO., LTD., Tokyo (JP)

(72) Inventor: Minoru Terada, Tokyo (JP)

(73) Assignee: EVATEC CO., LTD., Tokyo (JP)

( * ) Notice: Subject to any disclaimer, the term of this patent is extended or adjusted under 35 U.S.C. 154(b) by 822 days.

(21) Appl. No.: 17/755,613

(22) PCT Filed: Nov. 6, 2020

(86) PCT No.: PCT/JP2020/041552
§ 371 (c)(1),
(2) Date: May 3, 2022

(87) PCT Pub. No.: WO2021/090916
PCT Pub. Date: May 14, 2021

(65) Prior Publication Data
US 2022/0371887 A1    Nov. 24, 2022

(30) Foreign Application Priority Data
Nov. 8, 2019 (JP) .................................. 2019-203478

(51) Int. Cl.
*C01B 11/04* (2006.01)
*B01J 39/07* (2017.01)
*B01J 49/53* (2017.01)

(52) U.S. Cl.
CPC ............... *C01B 11/04* (2013.01); *B01J 39/07* (2017.01); *B01J 49/53* (2017.01)

(58) Field of Classification Search
None
See application file for complete search history.

(56) References Cited

U.S. PATENT DOCUMENTS 5,162,084 A * 11/1992 Cummings ........ B01D 53/1412
                                                    210/683
6,066,259 A * 5/2000 Viscardi .................. B01J 39/07
                                                    210/685

(Continued)

FOREIGN PATENT DOCUMENTS

JP          10-216535         8/1998
JP         2013-001620        1/2013

(Continued)

OTHER PUBLICATIONS

International Search Report issued in International Application No. PCT/JP2020/041552, Dec. 28, 2020, 4 pages w/translation.

*Primary Examiner* — John J Figueroa
(74) *Attorney, Agent, or Firm* — Merchant & Gould P.C.

(57) ABSTRACT

Provided is a method for preparing a hypochlorous acid aqueous solution by which a weakly acidic hypochlorous acid aqueous solution having a pH of about 3.5-7 can be obtained without substantially generating chlorine gas even immediately after regeneration or even with a new weakly acidic cation exchange resin. In a method for preparing a hypochlorous acid aqueous solution wherein an aqueous solution of hypochlorite is brought into contact with a weakly acidic cation exchanger to exchange a cation constituting the hypochlorite with hydrogen ions to increase the concentration of hypochlorous acid in the aqueous solution, a neutral salt solution of a strong acid and a strong base in an amount that may obtain the hypochlorous acid aqueous solution having a pH of at least 3.5 when the hypochlorite aqueous solution is brought into contact with the weakly acidic cation exchanger is brought into contact, prior to the contact between the hypochlorite aqueous solution and the weakly acidic cation exchanger, with a weakly acidic cation (Continued)

exchanger that has been regenerated or has not been substantially subjected to cation exchange.

2 Claims, 2 Drawing Sheets

(56) References Cited

U.S. PATENT DOCUMENTS

| | | | | |
|---|---|---|---|---|
| 6,387,243 | B1* | 5/2002 | Gasser | B01J 49/30 |
| | | | | 204/229.4 |
| 6,432,306 | B1* | 8/2002 | Viscardi | B01J 47/028 |
| | | | | 210/264 |
| 2007/0045193 | A1* | 3/2007 | Podszun | C08F 220/14 |
| | | | | 521/31 |
| 2019/0352198 | A1* | 11/2019 | Balidas | B01J 39/07 |
| 2023/0406703 | A1* | 12/2023 | Terada | C02F 1/76 |

FOREIGN PATENT DOCUMENTS

| | | |
|---|---|---|
| JP | 2014-043392 | 3/2014 |
| WO | 2018/146002 | 8/2018 |

* cited by examiner

METHOD FOR PREPARING HYPOCHLOROUS ACID AQUEOUS SOLUTION AND METHOD FOR REGENERATING WEAKLY ACIDIC CATION EXCHANGER

TECHNICAL FIELD

The present invention relates to a method for preparing hypochlorous acid aqueous solution and a regenerating treatment method for a weakly acidic cation exchanger. More specifically, it relates to methods of preparing hypochlorous acid aqueous solution using a weakly acidic cation exchanger and regenerating a weakly acidic cation exchanger used for the same purpose.

BACKGROUND ART

The sterilizing effects of hypochlorous acid have been widely used in a variety of fields, for example, to sterilize tap water and food manufacturing equipment.

The sterilizing effects of hypochlorous acid is exerted by hypochlorite ions ($ClO^-$) produced when hypochlorite salts such as sodium hypochlorite (NaClO) are dissolved in water, or by molecular hypochlorous acid (HClO) produced when hypochlorite ions ($ClO^-$) and hydrogen ions ($H^+$) are combined through acid reactions.

When hypochlorous acid is used for sterilization purposes, it is generally known that the non-dissociated molecular form of hypochlorous acid, or HClO, is the most effective for sterilization. It is also known that hypochlorite solutions, which are prepared by dissolving hypochlorite in water or other aqueous solvents, have a significantly variable sterilization effects depending on the pH of the solution.

Hypochlorous acid is present as hypochlorite ions at alkaline pH and is less sterilization effective. On the other hand, even at a strong acidic pH, such as below 3.5, sterilization is less effective and chlorine gas is also generated.

Hypochlorous acid is considered to be highly present in its non-dissociated molecular form when the pH is approximately 3.5 to 6.5.

On the other hand, sodium hypochlorite solution is an alkaline solution. Even if this sodium hypochlorite solution is diluted to 50-100 ppm, for example, which is the concentration generally used as sterilization water, the pH will only drop to about 8.5-9.5. When hypochlorous acid is used for sterilization purposes, it is desirable to lower the pH, i.e., the pH that presents a higher sterilization effect.

Methods for lowering the pH of sodium hypochlorite solutions include, for example, the electrolysis method and the two-component method. However, the electrolysis method requires a device equipped with an electrolyzer, which is expensive in terms of maintenance costs, and the electrodes deteriorate with use, resulting in high costs for parts replacement. Another problem with the electrolysis method is that it can only produce low-concentration hypochlorous acid.

On the other hand, the two-component method adjusts the pH to the acidic side by mixing a sodium hypochlorite solution with an acid solution such as hydrochloric acid. However, this two-component method has a major safety problem because it uses an acid solution such as hydrochloric acid to adjust the pH.

In other words, mixing the acid solution with sodium hypochlorite generates chlorine gas, which is dangerous to work with.

In this regard, several methods have been proposed to lower the pH of sodium hypochlorite solutions by using ion exchange resins instead of acid solutions.

Among others, the inventors have found and proposed in the past a method to produce hypochlorous acid aqueous solution without using an acid such as hydrochloric acid and without lowering the pH to a value that would generate chlorine gas, by using a weakly acidic ion exchanger that has a buffering effect above the pH at which chlorine gas is generated.

This method, in particular, includes the process of treating hypochlorite solution with a weakly acidic ion exchanger having a buffering effect at a pH higher than that at which chlorine gas is generated, thereby making it possible to obtain a weakly acidic hypochlorous acid aqueous solution with a pH of about 3.5 to 7 very safely without generating chlorine gas substantially (for example, the patent document 1.).

CITATION LIST

Patent Literature

Patent Literature 1: JP2014-043392 A

SUMMARY OF INVENTION

Technical Problem

By the way, weakly acidic cation exchange resins have a carboxylic acid group (—COOH) as an exchange group and are weakly acidic like acetic acid. Therefore, weakly acidic cation exchange resins can exchange bases such as NaOH and salts of weak acids such as $NaHCO_3$.

The carboxylic acid group (—COOH), which is the exchange group of the weakly acidic cation exchange resin, does not dissociate in acidic conditions. Therefore, weakly acidic cation exchange resins cannot theoretically decompose neutral salts such as NaCl and $Na_2SO_4$, which are salts of strong acids and strong bases, but can exchange bases such as NaOH and weak acid salts such as $NaHCO_3$.

Also, ion exchange resins have ion exchange capacity at a theoretical pH of about 3.5 to 5 or higher, depending on the acidity of their exchange groups. Therefore, the ion-exchange resin will not theoretically drop below this pH of about 3.5 to 5 after ion exchange.

However, the inventors have now discovered that weakly acidic cation exchange resins may exhibit properties like strongly acidic cation exchange resins at the initial phase of ion exchange.

Specifically, as mentioned above, theoretically, when sodium hypochlorite solution is treated with a weakly acidic cation exchange resin, a hypochlorous acid solution with a pH of approximately 3.5 to 5 or higher is generated, and the pH cannot be lower than 3.

In fact, however, we found that when sodium hypochlorite solution is treated with a weakly acidic cation exchange resin, the reaction with the sodium hypochlorite solution in the initial stage of the reaction, especially immediately after regeneration of the ion exchange resin or at the beginning of use of new products that have not been substantially subjected to cation exchange, produces a treated solution of pH 2 or less. In the following explanation, this phenomenon is referred to as the phenomenon of pH decrease in the initial phase of the reaction.

This means that the hypochlorous acid solution may drop to pH 2 or less and chlorine gas may be generated, making it impossible to obtain a weakly acidic hypochlorous acid aqueous solution of pH 3.5 to 7 without generating chlorine gas substantially, albeit at the limited stage of initial reaction with the weakly acidic cation exchange resin.

Therefore, a solution to this problem was sought.

In view of these circumstances, the present invention provides a method for preparing hypochlorous acid aqueous solution that can obtain a weakly acidic hypochlorous acid aqueous solution of pH 3.5 to 7 without substantially generating chlorine gas, even with a weakly acidic cation exchange resin immediately after regeneration or when it is new.

In cases where a substance in solution, regardless of hypochlorous acid or its salt, loses its physical properties due to the phenomenon of pH decrease in the initial phase of the reaction of the weakly acidic cation exchanger, it is desirable to have a regeneration treatment method for the weakly acidic cation exchanger that can suppress the phenomenon as much as possible to maintain the aforementioned physical properties.

Therefore, the present invention also provides a regeneration treatment method for a weakly acidic cation exchanger that can suppress as much as possible the phenomenon of pH decrease in the initial phase of the reaction of weakly acidic cation exchangers.

Solution to Problem

In order to solve the above conventional problems, in a method for preparing a hypochlorous acid aqueous solution of the present invention, (1) a method for preparing a hypochlorous acid aqueous solution wherein an aqueous solution of hypochlorite is brought into contact with a weakly acidic cation exchanger to exchange a cation constituting the hypochlorite with hydrogen ions to increase the concentration of hypochlorous acid in the aqueous solution, a neutral salt solution of a strong acid and a strong base in an amount that may obtain the hypochlorous acid aqueous solution having a pH of at least 3.5 when the hypochlorite aqueous solution is brought into contact with the weakly acidic cation exchanger is brought into contact, prior to the contact between the hypochlorite aqueous solution and the weakly acidic cation exchanger, with a weakly acidic cation exchanger that has been regenerated or has not been substantially subjected to cation exchange.

In addition, the regeneration treatment method for weakly acidic cation exchangers, (2) a regeneration treatment method for a weakly acidic cation exchanger that removes a cation from a solution to be treated that contains a substance that lose purposeful physical properties in a predetermined pH ranges lower than the solution to be treated and the cation, comprising an exchange capacity restoration treatment process, wherein the weakly acidic cation exchanger which was subjected to exchange the cation is contacted with an acid solution to release and remove the cation trapped in an exchange group, and a neutral salt solution contacting process, wherein a neutral salt solution of a strong acid and a strong base in an amount that obtains a treated solution with a pH that is higher than the predetermined pH range and at which the substance exhibits the purposeful physical property when subjected to exchange the cation of the solution to be treated is brought into contact with the weakly acidic cation exchanger that has subjected to the exchange capacity restoration process.

Advantageous Effects of Invention

The method of the present invention provides a method of preparing hypochlorous acid aqueous solution that can obtain a weakly acidic hypochlorous acid aqueous solution of pH 3.5 to 7 without generating chlorine gas substantially, even with a weakly acidic cation exchange resin immediately after regeneration or new. This is because, in the method for preparing an hypochlorous acid aqueous solution wherein an aqueous solution of hypochlorite is brought into contact with a weakly acidic cation exchanger to exchange the cation constituting the hypochlorite with hydrogen ions to increase the concentration of hypochlorous acid in the aqueous solution, a neutral salt solution of a strong acid and a strong base in an amount that may obtain the hypochlorous acid aqueous solution having a pH of at least 3.5 when the hypochlorite aqueous solution is brought into contact with the weakly acidic cation exchanger is brought into contact, prior to the contact between the hypochlorite aqueous solution and the weakly acidic cation exchanger, with a weakly acidic cation exchanger that has been regenerated or has not been substantially subjected to cation exchange.

The method of the present invention also provides a regeneration treatment method for weakly acidic cation exchanging the cation that can suppress as much as possible the phenomenon of pH decrease in the initial phase of the reaction of weakly acidic cation exchanging the cation. This is because, regeneration treatment method for a weakly acidic cation exchanger that removes the cation from a solution to be treated that contains a substance and the cation that lose purposeful physical properties in a predetermined pH ranges lower than the solution to be treated, comprising an exchange capacity restoration treatment process, wherein the weakly acidic cation exchanger which was subjected to exchange cation is contacted with an acid solution to release and remove the cation trapped in an exchange group, and a neutral salt solution contacting process, wherein a neutral salt solution of a strong acid and a strong base in an amount that obtains a treated solution with a pH that is higher than the predetermined pH range and at which the substance exhibits the purposeful physical property when subjected to exchanging the cation of the solution to be treated is brought into contact with the weakly acidic cation exchanger that has subjected to the exchange capacity restoration process.

DESCRIPTION OF EMBODIMENTS

Figure 1:
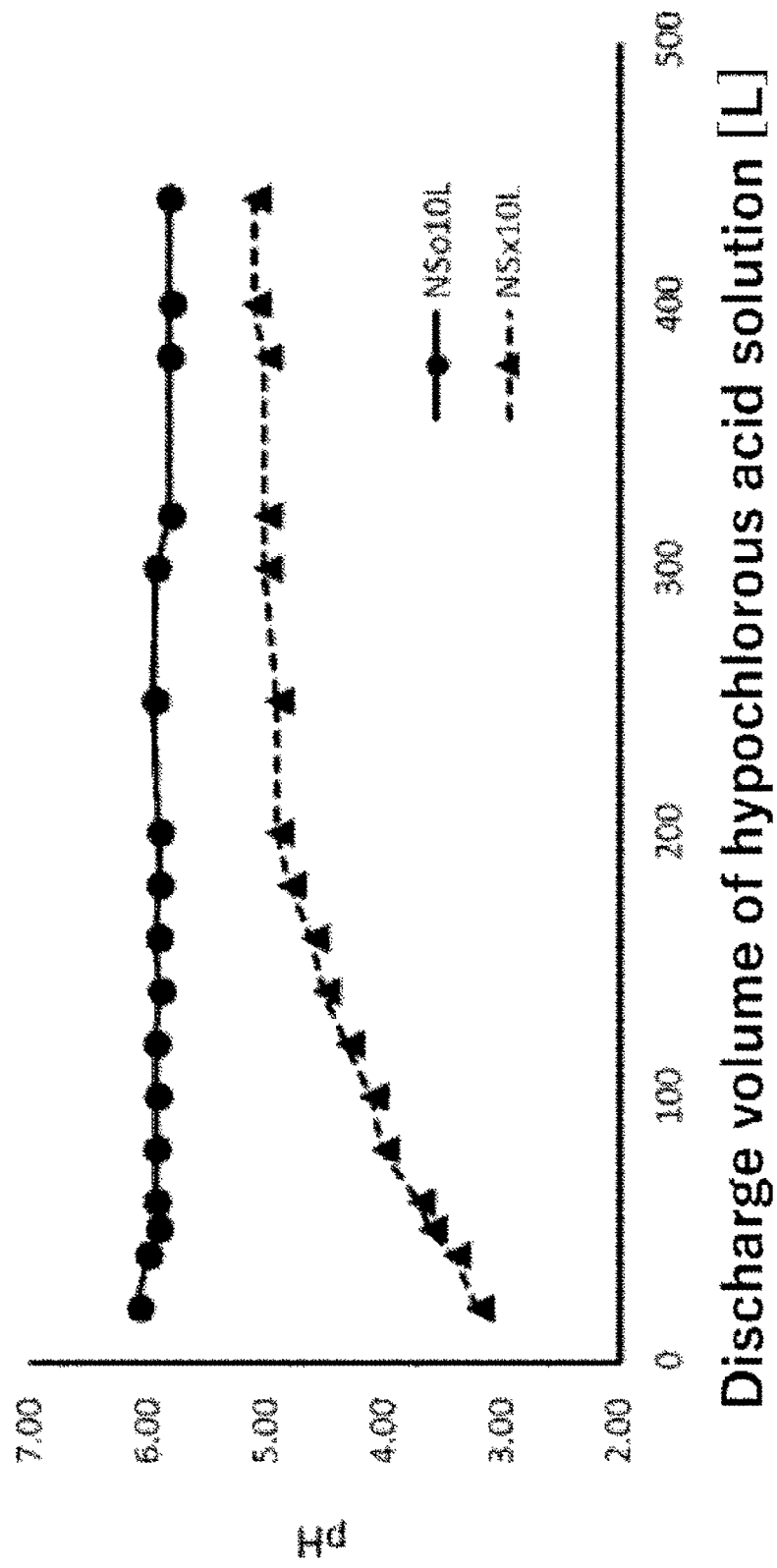
FIG. 1 The illustration shows the results of the pH confirmation test.

The present invention provides a method for preparing hypochlorous acid aqueous solution wherein an aqueous solution of hypochlorite is brought into contact with a weakly acidic cation exchanger to exchange a cation constituting the hypochlorite with hydrogen ions to increase the concentration of hypochlorous acid in the aqueous solution, even if the weakly acidic cation exchange resin is immediately after regeneration or is new for obtaining a weakly acidic hypochlorous acid aqueous solution of pH 3.5 to 7 without substantially generating chlorine gas.

An aqueous solution of hypochlorite is a solution of any salt of hypochlorous acid, such as sodium hypochlorite ($NaClO$), potassium hypochlorite ($KClO$) and calcium hypochlorite ($Ca(ClO)_2$) in an aqueous solvent, as is generally recognized by those skilled in the art.

Hypochlorite can be used with commercially available materials as well as materials produced by methods known to those skilled in the art. The solution can be in any other solution, including an aqueous solution containing prescribed components such as water and any additives described below. The solution can also be in buffer solution. Furthermore, the hypochlorite solution can contain any additives. For example, the hypochlorite solution can contain any weak acid salts such as sodium bicarbonate and calcium lactate.

The inclusion of such additives allows the hypochlorite solution to be adjusted to a more sterilization-active pH.

The hypochlorite can be sodium hypochlorite, potassium hypochlorite or calcium hypochlorite. The hypochlorite may be a single species or a mixture of several species. Furthermore, the hypochlorite solution may be a single hypochlorite solution or a mixture of hypochlorite solutions with different types of hypochlorite, with and without additives, and at different concentrations of these.

In the method of the present invention, hypochlorite solutions of any concentration may be used. For example, commercially available 12% sodium hypochlorite solutions can be diluted and used at concentrations from 1 to 12,000 ppm or higher, such as 10, 100, 200, 500, 1000, 10,000 and 12,000 ppm.

For example, the hypochlorite solution can be 500 ppm or higher. According to the method of the present invention, hypochlorous acid can be produced at concentrations such as 1000 ppm, which cannot be produced by conventional methods. It is also possible to directly produce hypochlorous acid at concentrations of 50 to 1000 ppm, which is the concentration actually used for sterilization purposes.

Hypochlorite solutions can also be prepared when implementing the production method of the present invention.

In addition to salts produced as solutions, such as sodium hypochlorite, solid salts can also be used. For example, a hypochlorite solution can be prepared by adding a solid such as calcium hypochlorite to water.

A weakly acidic cation exchanger is a weakly acidic cation exchanger that can theoretically exchange ions at a pH of about 3.5 or higher, e.g., 4-7 or higher. The weakly acidic cation exchanger can be, for example, an ion exchanger with a carboxylic acid group (—COOH) as an exchange group.

The weakly acidic cation exchangers can also be used to exchange ions with bases such as NaOH. In the method of the present invention, the weakly acidic cation exchanger known to those skilled in the art can be used.

The weakly acidic ion exchanger can be weakly acidic cation exchange resins such as a methacrylic acid type weakly acidic cation exchange resin and an acrylic acid type weakly acidic cation exchange resin. For example, the weakly acidic cation exchange resin can be Amberlite IRC-76 (Organo Corporation) and acrylic DIAION (registered trademark) WK40L (Mitsubishi Chemical Corporation), which are known to those skilled in the art. In addition to the weakly acidic cation exchange resin, any material with ion exchange action, such as silica gel, ceramics, and natural ores, can be used as the weakly acidic cation exchanger.

The weakly acidic cation exchanger can be used in any quantity. The method of the present invention can be used in excess without adjusting an amount of the weakly acidic cation exchanger.

Contact between a hypochlorite aqueous solution and a weakly acidic cation exchanger can be achieved, for example, by passing the hypochlorite aqueous solution through the column, if the weakly acidic cation exchanger is packed in a column. Contact between the weakly acidic cation exchanger and neutral salt solution can also be achieved by the same method as described below.

The aqueous solution of hypochlorite is then brought into contact with a weakly acidic cation exchanger, which exchanges the cation constituting hypochlorite, for example, sodium ions (Na+) in case sodium hypochlorite is employed as hypochlorite, and hydrogen ions. This results in an increase in the concentration of hypochlorite in aqueous solution depending on the pH of that solution.

A feature of the method of preparing hypochlorous acid aqueous solution in the embodiment is that a neutral salt solution of a strong acid and a strong base in an amount that may obtain the hypochlorous acid aqueous solution having a pH of at least 3.5 when the hypochlorite aqueous solution is brought into contact with the weakly acidic cation exchanger is brought into contact, prior to the contact between the hypochlorite aqueous solution and the weakly acidic cation exchanger, with a weakly acidic cation exchanger that has been regenerated or has not been substantially subjected to cation exchange.

Here, a neutral salt in the neutral salt solution is a salt of a strong acid and a strong base and is water soluble. Such the neutral salt can be, for example, dietary salt (NaCl), sodium sulfate (Na2SO4), and calcium chloride (CaCl2)). The neutral salt can also be a mixture of several neutral salts. The neutral salt solution can be prepared as an aqueous solution of such the neutral salt.

A process of contacting the neutral salt solution with the weakly acidic cation exchanger can be performed in any method. Contact means that the neutral salt solution is applied to the weakly acidic cation exchanger in such a way as to allow physical contact between the exchange group of the weakly acidic cation exchanger and the neutral salt solution.

Thus, a process of contacting the neutral salt solution with the weakly acidic cation exchange resin can be done, for example, by feeding the weakly acidic cation exchanger into a container containing the neutral salt solution in a batch method, or by passing the neutral salt solution through a column packed with the weakly acidic cation exchanger.

For example, in the case of contact using a column, the neutral salt solution can be brought into contact with a weakly acidic cation exchanger by connecting the inlet of the pump to one end of the column and the outlet of the pump to the other end of the column and adding a neutral salt solution to the circulation system.

The contact between the neutral salt solution and the weakly acidic cation exchanger, for example, when the neutral salt solution is passed through a column packed with a weakly acidic cation exchanger, the neutral salt solution is contacted with the it until the pH of the solution after passing through the column is greater than pH 5, pH 4.5, pH 4, pH 3.5 or pH 3. When circulating, since the pH of the solution after passing through has decreased, a base such as NaOH may be added to the solution after passing through to raise the pH and generate a neutral salt solution again, which is then circulated back to the column.

A more suitable contact is also made until the pH of the resulting hypochlorous acid aqueous solution is higher than the pH at which chlorine gas is generated when the contact between the hypochlorite aqueous solution and the weakly acidic cation exchanger after the contact process between the neutral salt solution and the weakly acidic cation exchanger is completed.

A pH higher than the pH at which chlorine gas is generated is the range of pH at which chlorine gas is not substantially generated when the pH of the hypochlorite solution is lowered. In the specification, weakly acidic includes a range of pH at which chlorine gas is not substantially generated when the pH of an alkaline hypochlorite solution is lowered. For example, weakly acidic refers to a range of weak to neutral acidity, a pH range of approximately 3.5 to 7.5 values, and especially a range of 4.0 to 7.0 values.

Chlorine gas is not substantially generated means that chlorine gas is not substantially generated at a level that is dangerous to living organisms, that chlorine bubbles cannot be substantially confirmed to be generated from a hypochlorite solution when the pH of the solution is lowered, or that there is practically no bleaching effect of chlorine when the pH of the hypochlorite solution is lowered. One of the guidelines is that the unique irritating odor of chlorine can hardly be felt even when the generated hypochlorous acid aqueous solution is put into a glass or the like and smelled directly. In the technical field, it is generally believed that chlorine gas is not generated even at a pH of 4.0, and that chlorine gas is not generated up to a pH of 3.5. Therefore, the pH at which chlorine gas is generated includes the range of pH less than such pH.

The neutral salt solution that is brought into contact with the weakly acidic cation exchanger is brought into contact in an amount that the pH of the resulting hypochlorous acid aqueous solution is higher than the pH at which chlorine gas is generated as described above, depending on the concentration of the neutral salt, the type of salt, and the manner of contact.

As an example, contact is made in a weakly acidic cation exchanger in sufficient quantity, time, and conditions to exchange the cation of neutral salt solutions with H of some exchange groups that have properties like strongly acidic cation exchange resins. The appropriate conditions depend on the weakly acidic ion exchanger used and can be easily selected by those skilled in the art.

For example, the process of contacting the neutral salt solution with the weakly acidic cation exchanger can be performed at room temperature. The contacting of the neutral salt solution with the weakly acidic cation exchanger is performed, for example, for more than 10 minutes, more than 30 minutes, more than 1 hour, more than 2 hours, more than 3 hours, more than 5 hours, and more than 24 hours. The concentration of the neutral salt solution can be, for example, more than 1%, more than 2%, more than 3%, more than 5% and more than 10%.

The weakly acidic cation exchanger that is brought into contact with the neutral salt solution is a weakly acidic cation exchanger that has been regenerated or has not been substantially subjected to exchange the cation.

A weakly acidic cation exchanger that have already been ion-exchanged can be regenerated by treatment with an acid solution such as hydrochloric acid. For example, a weakly acidic cation exchanger that has been in contact with sodium hypochlorite is ion-exchanged to produce R—COONa type, but the exchange group can be regenerated to R—COOH type by hydrochloric acid.

The hydrochloric acid produced by contacting a weakly acidic cation exchanger with sodium hypochlorite can also be brought into contact with a weakly acidic cation exchanger of the ion-exchanged R—COONa type, thereby causing H of the hydrochloric acid to be absorbed by the weakly acidic cation exchanger.

The contact of the neutral salt solution with the weakly acidic cation exchanger is performed prior to the contact of the hypochlorite aqueous solution with the weakly acidic cation exchanger. In other words, it is pre-treated to the weakly acidic cation exchanger in advance prior to the actual hypochlorous acid water production process.

After the process of contacting the weakly acidic cation exchanger with the neutral salt solution, it can be washed with a solution such as water to flush out the neutral salt solution and the strong acid solution that is produced. For example, a pump can be connected to the column to circulate the brine solution in the column packed with the weakly acidic cation exchanger, and then water can flow through the column to push out the residual brine solution and the hydrochloric acid produced for washing.

The weakly acidic cation exchanger treated in this way has ion exchange capacity in the weakly acidic to neutral range, for example, in the pH range of approximately 3.5 to 7.5 values, especially in the range of 4.0 to 7.0 values.

Therefore, the pH of the solution after treatment with a weakly acidic cation exchange resin is higher than weakly acidic pH, e.g., pH 3.5 or higher, so there is no risk of generating chlorine gas and sterilization is highly effective.

In addition, the ion exchange resin with buffering effect does not lower the pH below the pH at which chlorine gas is generated, even partially, as it adsorbs excess hydrogen ions while releasing the adsorbed sodium and calcium ions. And in the reaction between the hypochlorite solution and the ion exchange resin with buffering action, the ion exchange resin has the effect of lowering the pH.

Therefore, the weakly acidic cation exchange resin used in the present invention does not temporarily or partially fall below the pH that generates chlorine gas when lowering the pH of the hypochlorite solution. When the pH of hypochlorite solution is lowered by using an acid such as hydrochloric acid, as in the conventional production method of hypochlorous acid, the pH of the hypochlorite solution is lowered to the pH that generates chlorine gas temporarily or locally during the mixing process because the acid with a pH that generates chlorine gas is mixed with the hypochlorite solution. However, by using a weakly acidic cation exchange resin as in the present invention, chlorine gas is not generated.

This application also provides a regeneration treatment method for a weakly acidic cation exchanger, which removes a cation from a solution to be treated containing a substance that loses purposeful physical properties in a predetermined pH range lower than that of the solution to be treated and the cation, and which can suppress as much as possible the phenomenon of pH decrease in the initial of reaction of the weakly acidic cation exchanger. The regeneration treatment method for a weakly acidic cation exchanger in this embodiment shares some concepts with the method for preparing hypochlorous acid aqueous solution described above, and the description may be omitted for overlapping parts.

The features of the regeneration treatment method of the present embodiment are to include the following;

an exchange capacity restoration treatment process, wherein the weakly acidic cation exchanger which was subjected to exchange the cation is contacted with an acid solution to release and remove the cation trapped in an exchange group, and a neutral salt solution contacting process, wherein a neutral salt solution of a strong acid and a strong base in an amount that obtains a treated solution with a pH that is higher than the predetermined pH range and at which the substance exhibits the purposeful physical property when subjected to exchanging the cation of the solution to be treated is brought into contact with the weakly acidic cation exchanger that has subjected to the exchange capacity restoration process.

Not only the previously described method for preparing hypochlorous acid aqueous solution, but also the invention pertaining to the regeneration treatment method for the weakly acidic cation exchanger, is based on finding that the weakly acidic cation exchange resin has properties like the strongly acidic cation exchange resin at the initial stage of its reaction, and based on finding that weakly acidic cation exchange resin can be adjusted to be as reactive as theoretically possible by treating the weakly acidic cation exchange resin with a neutral salt solution of a strong acid and a strong base as a means of eliminating these properties.

In other words, the applicants have found that a weakly acidic cation exchange resin that has been ion-exchanged like R—COONa type and regenerated to R—COOH type by a strong acid such as hydrochloric acid has properties like a strongly acidic cation exchange resin in the initial stage of its reaction, as described above, and this has This has led to the completion of the invention.

Theoretically, neutral salts are ion-exchanged to produce an acid when brought into contact with a strongly acidic cation exchange resin, but neutral salts are not ion-exchanged when brought into contact with a weakly acidic cation exchange resin. However, in the method of the present invention, when a weakly acidic cation exchange resin is brought into contact with a neutral salt, the cation of the neutral salt solution are exchanged with the portion having the properties similar to a strongly acidic cation exchange resin at the initial stage of the reaction. Weakly acidic cation exchange resins have a complex three-dimensional structure. Therefore, it is thought that there are localized areas with a high density of ion exchange groups (—COOH). The strongly acidic property is assumed to occur at these areas of high density of ion exchange groups (—COOH).

In addition, in the method of the present invention, once the cation of the neutral salt solution are exchanged with a portion having the properties like a strongly acidic cation exchange resin, the weakly acidic cation exchange resin is not exchanged with the cation of the neutral salt solution, as is the theory. Therefore, even if an excess amount of neutral salt solution is brought into contact with the weakly acidic cation exchange resin, the processing capacity of the weakly acidic cation exchange resin will not be reduced.

The regeneration treatment method for a weakly acidic cation exchanger of the present embodiment is a regeneration treatment method applied to weakly acidic cation exchangers that remove a cation from a solution to be treated containing a predetermined substance and a cation.

The predetermined substance is a substance that loses its purposeful physical properties in a prescribed pH range lower than the pH of the solution to be treated. A typical example of such a substance is the preparation of hypochlorous acid aqueous solution using hypochlorite aqueous solution as described above. In this case, the predetermined substance is hypochlorous acid or hypochlorite ion, and at a predetermined pH range lower than the pH of the treated solution, that is, at a pH of 3.5 or lower than pH 3, hypochlorous acid decomposes and the strong sterilizing effects characteristic of hypochlorous acid as the target property are lost.

Of course, the substance in the method of regenerating a weakly acidic cation exchanger of the present embodiment is not limited to hypochlorous acid or the like, but can be any substance that meets the situation where some desired physical property is lost, as in the above case.

The exchange capacity restoration treatment process can be specifically realized by the same method as the weakly acidic cation exchanger regeneration process described above.

The neutral salt solution contact process is a process in which the weakly acidic cation exchanger that has subjected to the exchange capacity restoration treatment process is contacted with a neutral salt solution.

The neutral salt solution is the same as in the previous description, and is used in an amount appropriate to the concentration and mode of use to obtain a treated solution with a pH that is higher than a predetermined pH range and in which the substance exhibits said desired physical properties.

The prescribed pH range is the pH range lower than that of the solution to be treated, and is the pH range at which the prescribed substance loses its purposeful physical properties. The neutral salt solution contact process is adjusted until the pH range in which the weakly acidic cation exchanger exchanges ions is higher than the predetermined pH range, where the predetermined substance can exhibit the target physical properties mentioned earlier.

The solution after treatment in the neutral salt solution contact process may be contacted with an ion-exchanged weakly acidic cation exchanger.

When a weakly acidic cation exchanger is brought into contact with a neutral salt, the cation of the neutral salt solution is exchanged with the part having the properties like a strongly acidic cation exchange resin, producing a strong acid. For example, when a weakly acidic cation exchange resin is brought into contact with a brine solution, the sodium ions of the brine solution are exchanged with the part having the properties like a strongly acidic cation exchange resin, producing hydrochloric acid. The resulting hydrochloric acid is highly reactive and dangerous, and must be disposed of properly.

On the other hand, ion-exchanged weakly acidic cation exchanger can be regenerated by treatment with hydrochloric acid. For example, a weakly acidic cation exchanger that has been in contact with sodium hypochlorite is ion-exchanged to produce the R—COONa type, but can be regenerated to the R—COOH type by hydrochloric acid.

Therefore, hydrochloric acid produced by contacting a weakly acidic cation exchanger with sodium hypochlorite can be brought into contact with an ion-exchanged R—COONa type weakly acidic cation exchanger to absorb H of the hydrochloric acid into the weakly acidic cation exchanger.

In addition, when the generated strong acid solution is brought into contact with the ion-exchanged weakly acidic cation exchanger, it not only ion-exchanges H of the strong acid, but also regenerates the ion-exchanged weakly acidic cation exchanger to the R—COOH type.

As mentioned above, it is possible to maintain a constant pH level even when an excessive amount of weakly acidic cation exchange resin is used. The weakly acidic cation exchange resin also have the property of adsorbing mineral components such as calcium and magnesium in the solution. Therefore, by leaving the weakly acidic cation exchange resin in the hypochlorous acid solution without removing it after lowering the pH of the hypochlorite solution by the method of the present embodiment, it is also possible to prevent bleaching derived from the mineral components that occur in the equipment.

On the other hand, the strength of adsorption of weakly acidic cation exchange resins on various ions is characterized by a very high selectivity for H ions in particular, although the higher the valence of the ion, the greater the selectivity in general. Therefore, after H ions are exchanged with other cations, it can be easily returned to the R—COOH form using agents such as hydrochloric acid or sulfuric acid solutions. This makes it easy to regenerate it for repeated use, and regeneration is possible with only slightly more than the theoretical chemical equivalent amount of the agent.

The bleaching power of sodium hypochlorite is considered to be due to the chlorination reaction by dissolved chlorine. The factors contributing to the bleaching power are considered to be in the order of dissolved chlorine>sodium hypochlorite>hypochlorous acid. According to the method of the present invention, hypochlorous acid can be produced without substantially producing dissolved chlorine, thus yielding hypochlorous acid with less bleaching effect. In addition, as mentioned above, since dissolved chlorine is not substantially produced, no chlorination reaction occurs.

If there is a lot of dissolved chlorine, the odor will be very strong, but the method of the present invention allows hypochlorous acid to be produced with virtually no dissolved chlorine, so there is little odor due to chlorine.

Below, the preparation method for hypochlorous acid aqueous solution and the regeneration treatment method of weakly acidic cation exchanger are explained with reference to test results and other data.

(1. Construction of the Ion Exchange Unit)

Ion exchange units were constructed by filling the prescribed containers with weakly acidic cation exchange resin. A total of eight ion exchange units were created, four each of two sizes with different capacities.

Ion-exchange cylinders were used as containers. The ion exchange cylinder comprises of a bottomed cylindrical cylinder body with a threaded opening at the top, a water inlet and a water outlet port, and a lid that is screwed onto the threaded opening to seal the inside of the cylinder. The container is configured so that when the solution to be treated is supplied from the water inlet port, it comes into contact with the ion exchange resin filled in the cylinder body to undergo ion exchange, and the treated solution is discharged from the water outlet port.

The lid is equipped with a straight water collection pipe. The water collecting pipe is located in the center of an inner space of the cylinder from the lid to the bottom of the cylinder body when the lid is screwed closed, a trap is provided at the side end of the bottom to prevent ion exchange resin from flowing out with the water discharge, and the side end of the lid is connected to the water outlet port as mentioned above. Therefore, the treated solution that reaches the upper part of the inner space of the cylinder body from the water inlet port at the prescribed supply pressure permeates downward from the upper part of the ion exchange resin bed, and can be led out through the gap between the ion exchange resin and the bottom of the cylinder through the water collecting pipe. Therefore, the solution to be treated that has been sufficiently contacted with the ion exchange resin can be obtained as a treated solution.

The weakly acidic cation exchange resin used was Mitsubishi Chemical's DIAION weakly acidic cation exchange resin acrylic WK40L. 8 ion exchange cylinders were filled with weakly acidic cation exchange resin that had been swollen with water to create ion exchange units. Of the eight ion exchange units created, four were filled with 10 L of the weakly acidic cation exchange resin, and the other four were filled with 20 L of the weakly acidic cation exchange resin.

(2. Preparation of a Regenerated Ion Exchange Unit)

Next, an ion exchange unit filled with regenerated weakly acidic cation exchange resin was prepared for comparison with an ion exchange unit using new weakly acidic cation exchange resin.

First, two of the four ion exchange units filled with 10 L and two of the four ion exchange units filled with 20 L The ion exchange capacity was temporarily reduced by performing ion exchange of a sufficient amount of sodium hypochlorite solution on two of the four ion exchange units filled with 10 L and two of the four ion exchange units filled with 20 L.

Next, the four ion exchange units with reduced ion exchange capacity were supplied with a specified amount of hydrochloric acid at a specified concentration and passed through an exchange capacity restoration treatment process in which sodium trapped in the exchange groups was liberated and removed to create regenerated ion exchange units (four units in total: two 10 L units and two 20 L units) were created.

(3. Neutral Salt Solution Contact Treatment)

Next, ion exchange units subjected to neutral salt solution treatment were prepared for comparison with and without neutral salt solution treatment.

Specifically, an ion exchange unit filled with 10 L of weakly acidic cation exchange resin that has not been regenerated (brand new), an ion exchange unit filled with 10 L of weakly acidic cation exchange resin that has been regenerated, an ion exchange unit filled with 20 L of weakly acidic cation exchange resin that has not been regenerated (brand new), and an ion exchange unit filled with 20 L of weakly acidic cation exchange resin that has been regenerated, were prepared one by one. Each ion exchange unit was subjected to neutral salt solution contact treatment by passing through a 10% sodium chloride solution in the same volume as the weakly acidic cation exchange resin contained in each unit.

Through these series of operations on the ion exchange units, eight types of ion exchange units, ion exchange unit filled with 10 L of weakly acidic cation exchange resin that is new ("N "ew) and has not subjected neutral salt solution contact treatment ("S "alt) ("n "ot applied) (hereinafter referred to as ion exchange unit NSn10L), ion exchange unit filled with 20 L of weakly acidic cation exchange resin that is new ("N "ew) and has not subjected to neutral salt solution contact treatment ("S "alt) ("n "ot applied) (hereinafter referred to as ion exchange unit NSn20L), ion exchange unit filled with 10 L of new ("N "ew), neutral salt solution contact treated ("S "alt) ("a "pplied) weakly acidic cation exchange resin (hereinafter also referred to as ion exchange unit NSa10L), ion exchange unit filled with 20 L of new ("N "ew), neutral salt solution contact treated ("S "alt) ("a "pplied) weakly acidic cation exchange resin (hereinafter also referred to as ion exchange unit NSa20L), ion exchange unit filled with 10 L of weakly acidic cation exchange resin that has subjected to regeneration ("R "egeneration) but has not subjected to neutral salt solution contact treatment ("S "alt) ("n "ot applied) (Hereinafter also referred to as ion exchange unit RSn10L), ion exchange unit filled with 20 L of weakly acidic cation exchange resin that has subjected to regeneration ("R "egeneration) but has not subjected to neutral salt solution contact treatment ("S "alt) ("n "ot applied) (Hereinafter referred to as ion exchange unit RSn20L), ion exchange unit filled with 10 L of weakly acidic cation exchange resin that has subjected to regeneration ("R "egeneration) and neutral salt solution contact treatment ("S "alt") ("a "pplied") (hereinafter referred to as "ion exchange unit RSa10L), and ion exchange unit filled with 20 L of weakly acidic cation exchange resin that has subjected to regeneration ("R "egeneration) and neutral salt solution contact ("S "alt") treatment ("a "pplied") (hereinafter referred to as Ion exchange unit RSa20L), were prepared for the following pH confirmation test.

(4. pH Confirmation Test)

Next, we conducted a confirmation test to see how the pH fluctuated when an aqueous hypochlorite solution was passed through the prepared ion exchange unit.

Specifically, 200 ppm sodium hypochlorite solution was poured at 10 L/min into ion exchange units NSn10L, NSa10L, RSn10L, and RSa10L filled with 10 L of weakly acidic cation exchange resin, and 250 ppm sodium hypochlorite solution was poured at 10 L/min into ion exchange units NSn20L, NSa20L, RSn20L, and RSa20L filled with 20 L. The pH of the treated solution, a hypochlorous acid aqueous solution, was measured at every 20 L or 50 L discharge.

(4-1. Ion Exchange Unit Filled with 10 L)

FIG. 1 shows the results of the comparing ion exchange unit filled with 10 L of new weakly acidic cation exchange resin, NSn10 L that has not subjected to the neutral salt solution contact process. and NSn10 L that has subjected to the neutral salt solution contact process.

As shown in FIG. 1, the ion exchange unit NSn10L had a low pH of 3.20 at the beginning of discharge, and the pH was 3.40 at the time of 40 L discharge. The treated solution at the beginning of discharge had a strong irritating odor due to chlorine, and the treated solution at the time of 40 L discharge also had an irritating odor due to chlorine.

Thereafter, 3.60 (50 L), 4.10 (100 L), 4.60 (160 L), and 4.90 (200 L) of treated solution were discharged from the ion exchange unit NSn10L, and the irritating odor due to chlorine was no longer felt, respectively. Thereafter, no significant change in pH was observed until 440 L was discharged (pH 5.10), and no irritating odor due to chlorine was detected.

In contrast, the ion exchange unit NSa10L, which underwent the neutral salt solution contact process, had a pH of 6.08 from the beginning of discharge, and subsequently discharged treated solutions of 5.92 (50 L), 5.93 (100 L), 5.92 (160 L) and 5.91 (200 L). No irritating odor due to chlorine was detected in any of the treated solutions. In addition, no significant change in pH was observed until 440 L was discharged (pH 5.83), and no irritating odor due to chlorine was detected. In addition, the discharged treated solution showed extremely small pH fluctuations from pH 6.08 to 5.83 from the initial discharge to the point of discharge of 440 L, indicating that the treated solution can be generated with a stable pH compared to the case where the neutral salt solution contact process was not performed.

Although not shown in the figure, this trend was also observed in the results of the comparison between RSn10L, an ion exchange unit filled with 10 L of regenerated weakly acidic cation exchange resin that had not subjected to the neutral salt solution contact process, and RSa10L that had subjected to the neutral salt solution contact process.

Specifically, the ion exchange unit RSn10L had a low pH of 3.10 at the beginning of discharge and a pH of 3.43 at the time of 40 L discharge. In addition, a strong irritating odor due to chlorine was detected in the treated solution at the beginning of discharge, and the treated solution at the time of 40 L discharge also had an irritating odor due to chlorine.

After that, 3.50 (50 L) was discharged from the ion exchange unit RSn10L, and after that, the treated solution with a pH of 3.5 or higher was discharged with an approximate tendency to approach pH 5. After the pH reached 3.50 or higher, no irritating odor due to chlorine was detected.

In contrast, the ion exchange unit RSa10L, which underwent the neutral salt solution contact process, had a pH of 5.60 from the beginning of discharge and continued to discharge treated solutions with approximately the same pH. No irritating odor due to chlorine was detected in any of the treated solutions.

(4-2. Ion Exchange Unit Filled with 20 L)

Figure 2:
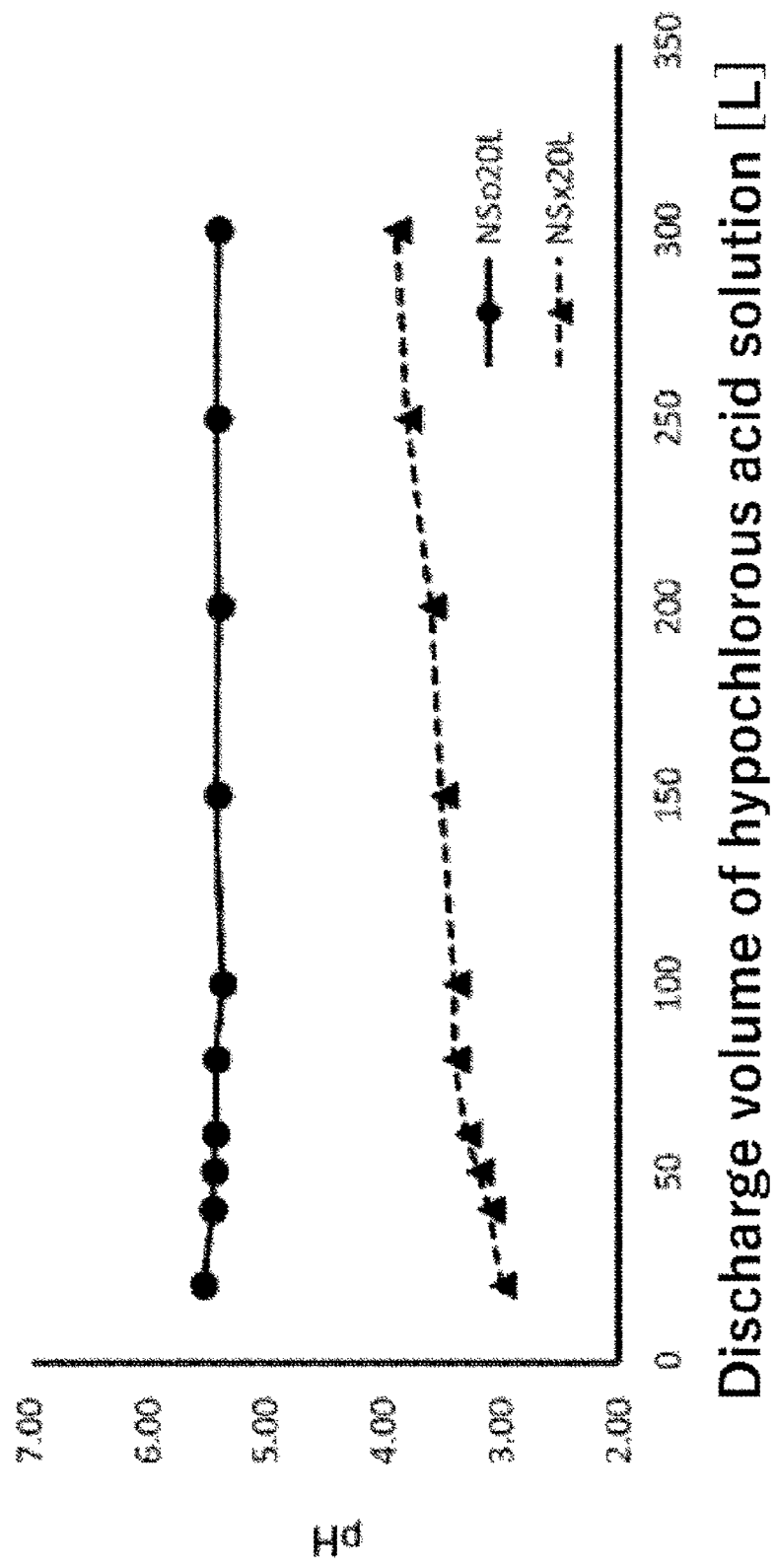
FIG. 2 The illustration shows the results of the pH confirmation test.

Next, FIG. 2 shows the results of comparing ion exchange unit filled with 20 L of new weakly acidic cation exchange resin, NSn20L that has not subjected to the neutral salt solution contact process and NSa20L that has subjected to the neutral salt solution contact process.

As shown in FIG. 2, the ion exchange unit NSn20L had an extremely low pH of 3.00 at the beginning of the discharge, and the pH was 3.10 at the time 40 L was discharged. This low pH trend was still observed even when the water discharge volume reached 100 L (pH 3.40). Although further research is needed to elucidate this phenomenon, it is thought to be due to the increase in the part having strongly acidic cation exchange resin-like properties in the bed formed by the filling of the weakly acidic cation exchange resin, compared to NSn10L, resulting in a slower increase in pH.

A strong irritating odor due to chlorine was detected in the treated solution at the beginning of discharge, and an irritating odor due to chlorine was also detected in the treated solution at the 100 L discharge.

Thereafter, 3.50 (150 L), 3.60 (200 L), 3.80 (250 L), and 3.90 (300 L) of treated solution were discharged from the ion exchange unit NSn20L, and the irritating odor due to chlorine was no longer felt, respectively. Although not shown in the figure, no irritating odor due to chlorine was detected even after the discharge volume exceeded 400 L.

In contrast, the ion exchange unit NSa20L, which underwent the neutral salt solution contact process, had a pH of 5.54 from the beginning of discharge and subsequently discharged treated solutions of 5.45 (50 L), 5.38 (100 L), 5.42 (150 L), and 5.40 (200 L). No irritating odor due to chlorine was detected in any of the treated solutions. In addition, no significant changes in pH were observed until 300 L (pH 5.41) was discharged, and even up to a discharge volume exceeding 400 L (not shown in the figure), and no irritating odor due to chlorine was detected. It should be noted that when NSa10L and NSa20L ion exchange units with different filling volumes are compared, the treated solution discharged from NSa20L, which has a larger filling volume, shows extremely small and stable pH fluctuations from the initial discharge, which tends to make it suitable for the characteristics of the present invention. This is an extremely interesting result considering the fact that the larger the volume of NSn10L and NSn20L, which are not treated with neutral salt solution, the more inconvenient the initial pH decrease is, the longer the initial pH decrease lasts.

Although not shown in the figure, this trend was also observed in the results of the comparing RSn20L, which the ion exchange unit filled with 20 L of regenerated weakly acidic cation exchange resin, had not subjected to the neutral salt solution contact process, with RSa20L, which had subjected to the neutral salt solution contact process.

Specifically, the ion exchange unit RSn20L had a low pH of 3.10 at the beginning of discharge and a pH of 3.45 at the time of 100 L discharge. In addition, the treated solution at the beginning of discharge had a strong irritating odor due to chlorine, and the treated solution at the time of discharge of 100 L also had an irritating odor due to chlorine.

After that, 3.50 (150 L) was discharged from the ion exchange unit RSn20L, and after that, the treated solution with a pH of 3.5 or higher was discharged at a slope that would exceed pH 4. No irritating odor due to chlorine was detected after the pH reached or exceeded 3.50.

In contrast, the ion exchange unit RSa20L, which underwent the neutral salt solution contact process, had a pH of 5.60 from the beginning of discharge and continued to discharge treated solutions with approximately the same pH. No irritating odor due to chlorine was detected in any of the treated solutions.

Based on the results of these tests, it was shown that, according to the method for preparing hypochlorous acid aqueous solution of the present embodiment, it is possible to obtain weakly acidic hypochlorous acid aqueous solutions of pH 3.5 to 7 without generating chlorine gas substantially, even with the weakly acidic cation exchange resin immediately after regeneration or new ones.

Based on the results of the regenerated ion exchange units RSn10L, RSa10L, RSn20L, and RSa20L, it was shown that the regeneration treatment method for the weakly acidic cation exchanger can suppress the phenomenon of pH decrease in the initial of reaction of the weakly acidic cation exchanger reaction as much as possible.

The operations described above can also be used to adjust the pH range at which the weakly acidic cation exchanger exchanges ions to a pH as per theoretical values.

In other words, the present application may also include the following inventions made in view of the background of the need for a means to prevent a weakly acidic cation exchange resin from showing ion exchange capacity below the theoretical ion exchange range, i.e., below a pH of about 3.5 to 7.0.

(a) A method for adjusting the pH range in which a weakly acidic cation exchanger exchanges ions, comprising the process of contacting weakly acidic cation exchanger with a neutral salt solution.

(b) The method as described in (a), further comprising the process of contacting the solution after treatment in the neutral salt treatment process with the ion-exchanged weakly acidic cation exchanger.

(c) The method as described in (a), wherein the neutral salt solution is a brine solution.

(d) A method for producing hypochlorite solution, comprising the process of contacting said weakly acidic cation exchanger with a neutral salt solution and the process of contacting the weakly acidic cation exchanger with a hypochlorite solution.

And according to these inventions, the reaction pH of the weakly acidic cation exchanger can be set to approximately pH 3.5 or higher. In addition, according to the present invention, the hypochlorous acid solution can be easily adjusted without lowering the pH of the solution below the pH at which chlorine is generated (i.e., below pH 3.5) when the hypochlorous acid solution is produced using the weakly acidic cation exchanger.

Finally, the description of each of the above-mentioned embodiments is an example of the present invention, and the invention is not limited to the above-mentioned embodiments. Therefore, it is of course possible to make various changes other than the above mentioned embodiments, depending on the design, etc., as long as such changes do not depart from the technical concept of the invention.

The invention claimed is:

1. A method for preparing a hypochlorous acid aqueous solution wherein an aqueous solution of hypochlorite is brought into contact with a weakly acidic cation exchanger to exchange a cation constituting the hypochlorite with hydrogen ions to increase the concentration of hypochlorous acid in the aqueous solution, wherein, prior to the contact between the hypochlorite aqueous solution with the weakly acidic cation exchanger, contacting the aqueous solution with a neutral salt solution of a strong acid and a strong base in an amount that provides a hypochlorous acid aqueous solution having a pH of at least 3.5 when the hypochlorite aqueous solution is brought into contact with the cation exchanger, wherein the cation exchanger has been regenerated or has not been substantially subjected to cation exchange.

2. A regeneration treatment method for a weakly acidic cation exchanger that removes a cation from a solution to be treated that contains a substance that lose purposeful physical properties in a predetermined pH ranges lower than the solution to be treated and the cation, comprising an exchange capacity restoration treatment process, wherein the weakly acidic cation exchanger which was subjected to exchange the cation is contacted with an acid solution to release and remove the cation trapped in an exchange group, and a neutral salt solution contacting process, wherein a neutral salt solution of a strong acid and a strong base in an amount that obtains a treated solution with a pH that is higher than the predetermined pH range and at which the substance exhibits the purposeful physical property when subjected to exchange the cation of the solution to be treated is brought into contact with the weakly acidic cation exchanger that has subjected to the exchange capacity restoration process.

* * * * *